(12) United States Patent
Komori et al.

(10) Patent No.: US 9,247,170 B2
(45) Date of Patent: Jan. 26, 2016

(54) TRIPLE CONVERSION GAIN IMAGE SENSOR PIXELS

(71) Applicant: Semiconductor Components Industries, LLC, Phoenix, AZ (US)

(72) Inventors: Hirofumi Komori, San Jose, CA (US); Wei Gao, San Jose, CA (US); Paul Perez, Boise, ID (US); Hui Tian, Cupertino, CA (US); Xia Zhao, Campbell, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 195 days.

(21) Appl. No.: 14/031,797

(22) Filed: Sep. 19, 2013

(65) Prior Publication Data

US 2014/0078368 A1    Mar. 20, 2014

Related U.S. Application Data

(60) Provisional application No. 61/703,492, filed on Sep. 20, 2012.

(51) Int. Cl.
| | | |
|---|---|---|
| *H04N 5/3745* | (2011.01) | |
| *H04N 5/355* | (2011.01) | |
| *H04N 5/374* | (2011.01) | |

(52) U.S. Cl.
CPC ........... *H04N 5/3745* (2013.01); *H04N 5/3559* (2013.01); *H04N 5/3742* (2013.01); *H04N 5/37457* (2013.01)

(58) Field of Classification Search
CPC ..... H04N 5/341; H04N 5/347; H04N 5/3559; H04N 5/3745; H04N 5/52

USPC ................................................ 348/308, 229.1
See application file for complete search history.

(56) References Cited

U.S. PATENT DOCUMENTS

| | | | | |
|---|---|---|---|---|
| 7,327,393 | B2 | 2/2008 | Ying et al. | |
| 8,896,733 | B2 * | 11/2014 | Solhusvik | 348/294 |
| 2004/0252209 | A1 | 12/2004 | Loose | |
| 2006/0274176 | A1 * | 12/2006 | Guidash | 348/300 |
| 2009/0237540 | A1 * | 9/2009 | Johnson | 348/308 |
| 2010/0097508 | A1 * | 4/2010 | Yanagita et al. | 348/301 |
| 2010/0118167 | A1 * | 5/2010 | Johnson | 348/294 |
| 2010/0182465 | A1 * | 7/2010 | Okita | 348/273 |
| 2010/0225795 | A1 * | 9/2010 | Suzuki et al. | 348/300 |
| 2012/0188427 | A1 | 7/2012 | Solhusvik | |
| 2013/0248939 | A1 * | 9/2013 | Sakai et al. | 257/231 |

\* cited by examiner

*Primary Examiner* — John Villecco
(74) *Attorney, Agent, or Firm* — Treyz Law Group, P.C.; Jason Tsai; Zachary D. Hadd

(57) ABSTRACT

An image sensor having pixel circuitry operable in multiple gain modes is provided. The pixel circuitry may include first and second floating diffusion (FD) regions, a first photodiode coupled to the first FD region via a first transfer gate, a second photodiode coupled to the first FD region via a second transfer gate, a third photodiode coupled to the second FD region via a third transfer gate, and a fourth photodiode coupled to the second FD region via a fourth transfer gate. The first FD region may be coupled to the second FD region via first and second control transistors. The control transistors may be connected to a shared reset transistor. During readout, both control transistors may be deactivated to provide a high gain mode, only one transistor may be activated to provide an intermediate gain mode, or both control transistors may be activated to provide a low gain mode.

16 Claims, 8 Drawing Sheets

TRIPLE CONVERSION GAIN IMAGE SENSOR PIXELS

This application claims the benefit of provisional patent application No. 61/703,492, filed Sep. 20, 2012, which is hereby incorporated by reference herein in its entirety.

BACKGROUND

The present invention relates to image sensors and, more particularly, to image sensors that are used to produce high-dynamic-range images.

Image sensors are commonly used in electronic devices such as cellular telephones, cameras, and computers to capture images. In a typical arrangement, an electronic device is provided with a single image sensor and a single corresponding lens. Some electronic devices use arrays of image sensors and corresponding lenses to gather image data. In certain applications, such as when acquiring still or video images of a scene with a large range of light intensities, it may be desirable to capture high-dynamic-range images. In high-dynamic-range images, highlight and shadow detail can be retained that would otherwise be lost in a conventional image.

It would be desirable to be able to capture high-dynamic-range images with electronic devices containing image sensors.

DETAILED DESCRIPTION

Embodiments of the present invention relate to image sensors, and more particularly, to backside illuminated image sensors with image sensor pixels operable in at least three conversion gain modes. It will be recognized by one skilled in the art, that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices include image sensors that gather incoming light to capture an image. The image sensors may include arrays of imaging pixels. The pixels in the image sensors may include photosensitive elements such as photodiodes that convert the incoming light into image signals. Image sensors may have any number of pixels (e.g., hundreds or thousands of pixels or more). A typical image sensor may, for example, have hundreds of thousands or millions of pixels (e.g., megapixels). Image sensors may include control circuitry such as circuitry for operating the imaging pixels and readout circuitry for reading out image signals corresponding to the electric charge generated by the photosensitive elements.

Figure 1:
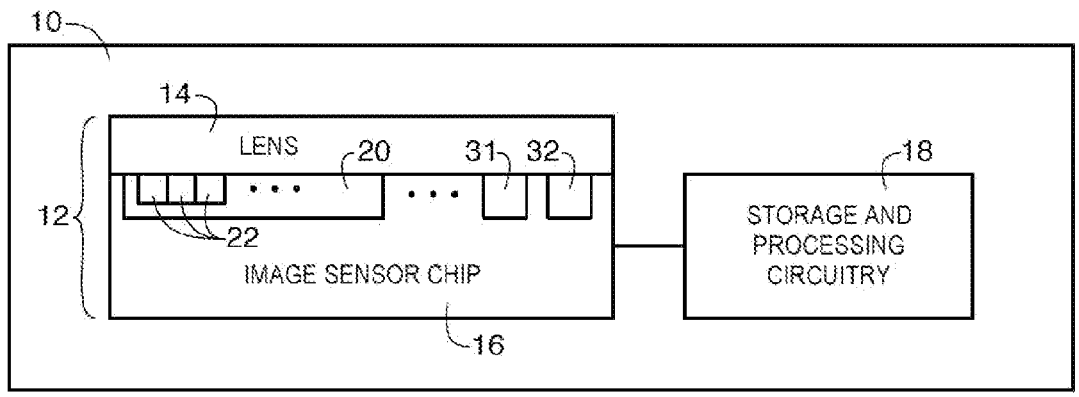
FIG. 1 is a diagram of an illustrative electronic device in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. Image sensor 16 may be an image sensor system-on-chip (SOC) having additional processing and control circuitry such as analog control circuitry 31 and digital control circuitry 32 on a common image sensor integrated circuit die with image pixel array 20 or on a separate companion die/chip.

During image capture operations, light from a scene may be focused onto an image pixel array (e.g., array 20 of image pixels 22) by lens 14. Image sensor 16 provides corresponding digital image data to analog circuitry 31. Analog circuitry 31 may provide processed image data to digital circuitry 32 for further processing. Circuitry 31 and/or 32 may also be used in controlling the operation of image sensor 16. Image sensor 16 may, for example, be a backside illumination image sensor. If desired, camera module 12 may be provided with an array of lenses 14 and an array of corresponding image sensors 16.

Device 10 may include additional control circuitry such as storage and processing circuitry 18. Circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be further processed and/or stored using processing circuitry 18. Processed image data may, if desired, be provided to external equipment (e.g., a computer or other device) using wired and/or wireless communications paths coupled to processing circuitry 18. Processing circuitry 18 may be used in controlling the operation of image sensors 16.

Image sensors 16 may include one or more arrays 20 of image pixels 22. Image pixels 22 may be formed in a semiconductor substrate using complementary metal-oxide-semiconductor (CMOS) technology or charge-coupled device (CCD) technology or any other suitable photosensitive devices.

Some image sensors may be provided with gain selection circuitry to help produce images with enhanced dynamic range. In particular, each pixel may generate a corresponding output value using a selected gain setting. The selected gain setting may depend on the amount of light captured by the pixel during an exposure (i.e., a period of time inversely proportion to shutter speed).

For example, consider a scenario in which an image sensor containing a first set of image pixels and a second set of image pixels is used to capture an image. The first and second sets of image pixels may be exposed to incoming light for a given period of time. The first set of image pixels may capture a portion of the image that is bright, whereas the second set of image pixels may capture a portion of the image that is dark. The gain selection circuitry may detect this difference, thereby configuring the first set of image pixels to generate image data using a low gain setting and configuring the second set of image pixels to generate image data using a high gain setting. Generating a complete image using this approach (e.g., by combining output data generated using the first and second sets of image pixels with respective gain settings) enhances the dynamic range of the captured image. If the gain selection circuitry were not used, the captured image may suffer from blown out highlights or overexposed shadows.

Figure 2:
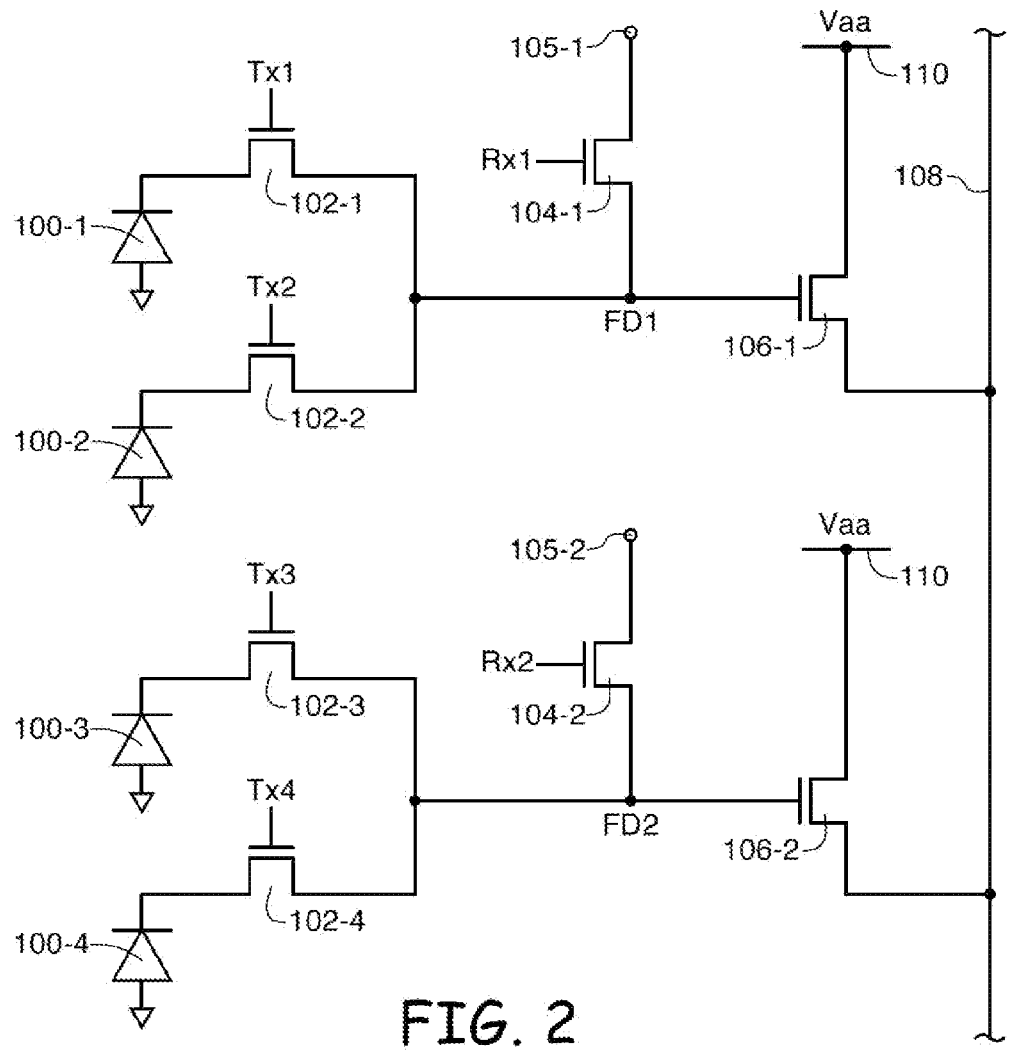
FIG. 2 is circuit diagram of a conventional 1×2 way shared pixel arrangement.

FIG. 2 is a circuit diagram showing a conventional image sensor pixel arrangement that is used to provide a high gain setting. As shown in FIG. 2, each pair of photodiodes 100 is coupled to a corresponding floating diffusion (FD) node. In FIG. 2, a first photodiode 100-1 is coupled to a first floating diffusion node FD1 via a first charge transfer gate 102-1 (i.e., a transistor that receives Tx1); a second photodiode 100-2 is coupled to FD1 via a second charge transfer gate 102-2 (i.e., a transistor that receives Tx2); a third photodiode 100-3 is coupled to a second floating diffusion node FD2 via a third charge transfer gate 102-3 (i.e., a transistor that receives Tx3); and a fourth photodiode 100-4 is coupled to FD2 via a fourth charge transfer gate 102-4 (i.e., a transistor that receives Tx4).

A first reset transistor 104-1 is coupled between a reset drain line 105-1 (i.e., a terminal that controls selected row and non-selected rows) and FD1, whereas a second reset transistor 104-2 is coupled between a reset drain line 105-2 and FD2. Reset transistors 104-1 and 104-2 are controlled by reset signals Rx1 and Rx2, respectively. The reset signals are asserted to reset the floating diffusion nodes to a predetermined reset level.

A first source follower transistor 106-1 has a drain terminal that is connected to line 110, a gate terminal that is connected to FD1, and a source terminal that is connected to an output line 108. A second source follower transistor 106-2 has a drain terminal that is connected to line 110, a gate terminal that is connected to FD2, and a source terminal that is connected to output line 108. Each photodiode in that particular column of pixels may be coupled to that output line 108. The configuration of FIG. 2 in which two photodiodes share a common floating diffusion node is referred to as a 1×2 way shared pixel and provides high gain since the capacitance at each floating diffusion node is relatively small (i.e., compared to the low gain configuration of FIG. 3).

Figure 3:
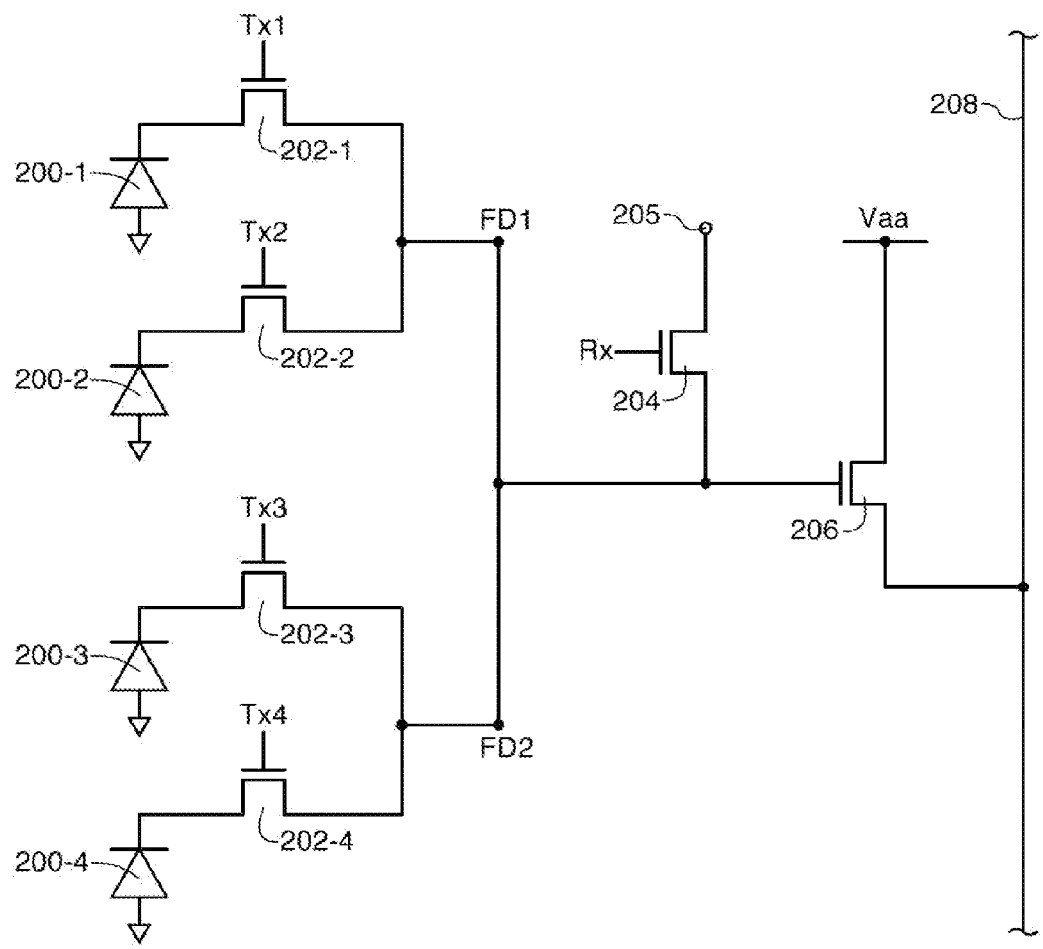
FIG. 3 is a circuit diagram of a conventional 1×4 way shared pixel arrangement.

FIG. 3 is a circuit diagram showing a conventional image sensor pixel arrangement that is used to provide a low gain setting. As shown in FIG. 3, each group of four photodiodes 200 is coupled to a corresponding FD node. In particular, first photodiode 200-1 is coupled to a first FD node FD1 via a first charge transfer gate 202-1; a second photodiode 200-2 is coupled to FD1 via a second charge transfer gate 202-2; a third photodiode 200-3 is coupled to a second FD node FD2 via a third charge transfer gate 202-3; and a fourth photodiode 200-4 is coupled to FD2 via a fourth charge transfer gate 202-4. FD1 and FD2 may be shorted together to form a combined FD node.

A reset transistor 204 has a drain terminal that is connected to a reset drain line 205 (i.e. a terminal that controls selected row and non-selected rows), a gate terminal that receives reset signal Rx, and a source terminal that is connected to the combined FD region. A source-follower transistor 206 has a drain terminal that is connected to line 210, a gate terminal that is connected to the combined FD node, and a source terminal that is connected to column output line 208. The configuration of FIG. 3 in which four photodiodes share a combined floating diffusion node is referred to as a 1×4 way shared pixel and provides low gain since the capacitance at the combined node is relatively large (i.e., the capacitance at the combined FD node is approximately double that of the conventional 1×2 shared pixel of FIG. 2 since two floating diffusion regions are shorted together).

Figure 4:
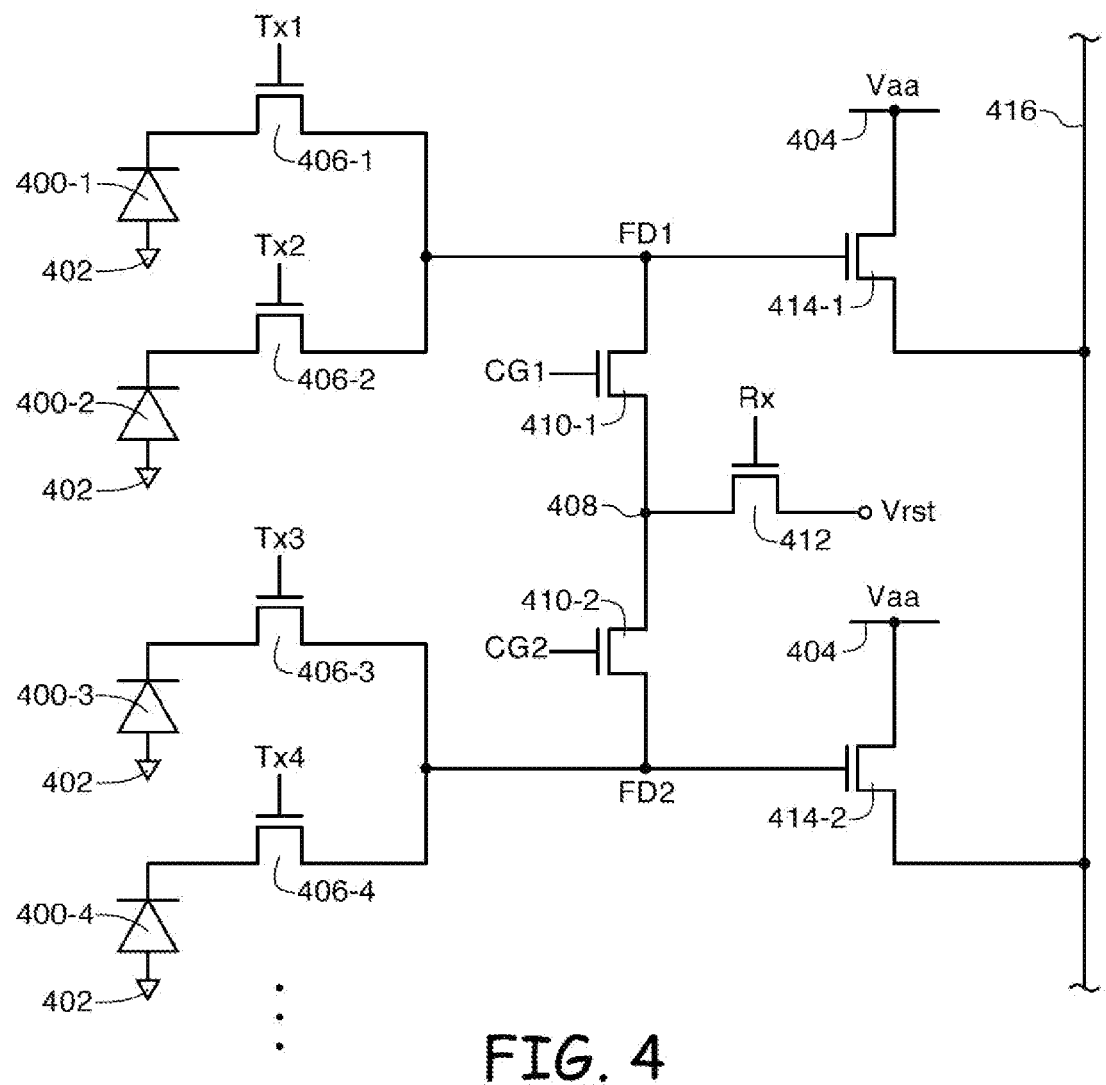
FIG. 4 is a circuit diagram of an illustrative triple conversion gain image sensor pixel in accordance with an embodiment of the present invention.

The conventional pixel arrangement of FIG. 2 is only capable of providing high gain, whereas the conventional pixel arrangement of FIG. 3 is only capable of providing low gain. It may therefore be desirable to provide an image sensor pixel operable in multiple gain modes. FIG. 4 shows one suitable embodiment of an illustrative image sensor pixel arrangement that is capable of operating in more than one gain mode. FIG. 4 shows pixel circuitry that includes a first photodiode 400-1 having a p-type terminal coupled to ground power supply line 402 and an n-type terminal coupled to a first floating diffusion node FD1 via a first charge transfer transistor 406-1 (e.g., a transistor that is controlled by signal Tx1), a second photodiode 400-2 having a p-type terminal coupled to ground line 402 and an n-type terminal coupled to first floating diffusion node FD1 via a second charge transfer transistor 406-2 (e.g. a transistor that is controlled by signal Tx2), a third photodiode 400-3 having a p-type terminal coupled to ground line 402 and an n-type terminal coupled to a second floating diffusion node FD2 via a third charge transfer transistor 406-3 (e.g., a transistor that is controlled by signal Tx3), and a fourth photodiode 400-4 having a p-type terminal coupled to ground line 402 and an n-type terminal coupled to second floating diffusion node FD2 via a fourth charge transfer transistor 406-4 (e.g. a transistor that is controlled by signal Tx4).

The pixel circuitry may further include a first source follower transistor 414-1 having a drain terminal coupled to a positive power supply line 404 (e.g., a power supply line on which positive power supply voltage Vaa is provided), a gate terminal that is coupled to FD1, and a source terminal that is directly connected to a shared column output line 416 and a second source follower transistor 414-2 having a drain terminal coupled to power supply line 404, a gate terminal that is coupled to FD2, and a source terminal that is directly coupled to column output line 416 (e.g., a row select transistor need not be used).

To provide the pixel circuitry with multiple gain modes, a first control transistor 410-1 may have a first source-drain terminal that is coupled to FD1, a gate terminal that receives a first conversion gain control signal CG1, and a second source-drain terminal that is coupled to an intermediate node 408. Similarly, a second control transistor 410-2 may have a first source-drain terminal that is coupled to FD2, a gate terminal that receives a second conversion gain control signal CG2, and a second source-drain terminal that is coupled to intermediate node 408. The pixel circuitry may further include a reset transistor 412 having a first source-drain terminal that is coupled to node 408, a gate terminal that receives reset signal Rx, and a second source-drain terminal on which reset voltage Vrst is applied. Reset voltage Vrst controls the selection and de-selection of rows. Reset control signal Rx may be asserted to drive node 408 to reset level Vrst.

Pixel circuitry configured using the arrangement of FIG. 4 may be operable in a high conversion gain (HCG) mode, a medium (intermediate) conversion gain (MCG) mode, and a low conversion gain (LCG) mode. During high conversion gain mode, both conversion gain control signals CG1 and CG2 are deasserted during readout. As a result, the readout node only includes the floating diffusion region capacitance. During reset operations, a selected one of FD1 and FD2 is reset via transistor 410-1 or 410-2 (e.g. by asserting one of CG1 and CG2 while Rx is asserted). The asserted conversion gain control signal should be deasserted before Rx is deasserted to minimize reset charge injection. Pixel circuitry operated in this mode may be referred to as a 1×2 way shared (2WS) pixel.

During medium conversion gain mode, one of conversion gain control signals CG1 and CG2 is asserted during readout (e.g., if CG1 is high, then CG2 is low, vice versa). As a result, the readout node includes both the floating diffusion region of the either FD1 or FD2 capacitance and the gate capacitance of the either transistor 410-1 or 410-2. During reset operations, a selected one of FD1 and FD2 is reset via transistor 410-1 or 410-2 (e.g., by asserting one of CG1 and CG2 while Rx is asserted). Pixel circuitry operated in this mode may also be referred to as a 1×2 way shared (2WS) pixel.

During low conversion gain mode, both conversion gain control signals CG1 and CG2 are asserted during readout (e.g., a dual signal may be read out using both source follower transistors 414-1 and 414-2). Turning on both transistors 410-1 and 410-2 shorts the two floating diffusion nodes. As a result, the combined readout node includes two floating diffusion region capacitances (e.g., the capacitance of FD1 and the capacitance of FD2) and the gate capacitances of both transistors 410-1 and 410-2. During reset operations, FD1 and FD2 are simultaneously reset via transistor 410-1 and 410-2 (e.g., by asserting CG1 and CG2 while Rx is asserted). Pixel circuitry operated in this mode may also be referred to as a 1×4 way shared (4WS) pixel. When operating the low conversion gain mode, charge from connected photodiodes 400-1, 400-2, 400-3, 400-4 may either be separate or combined ("binned").

The example of FIG. 4 showing only four photodiodes is merely illustrative and does not serve to limit the scope of the present invention. In general, each group of four photodiodes on image sensor 16 can be arranged in this way. Pixel circuitry arranged using the configuration of FIG. 4 may effectively eliminate the need for additional row select transistors, may share one reset transistor among four photodiodes, and may yield a symmetric pixel layout.

Figure 5:
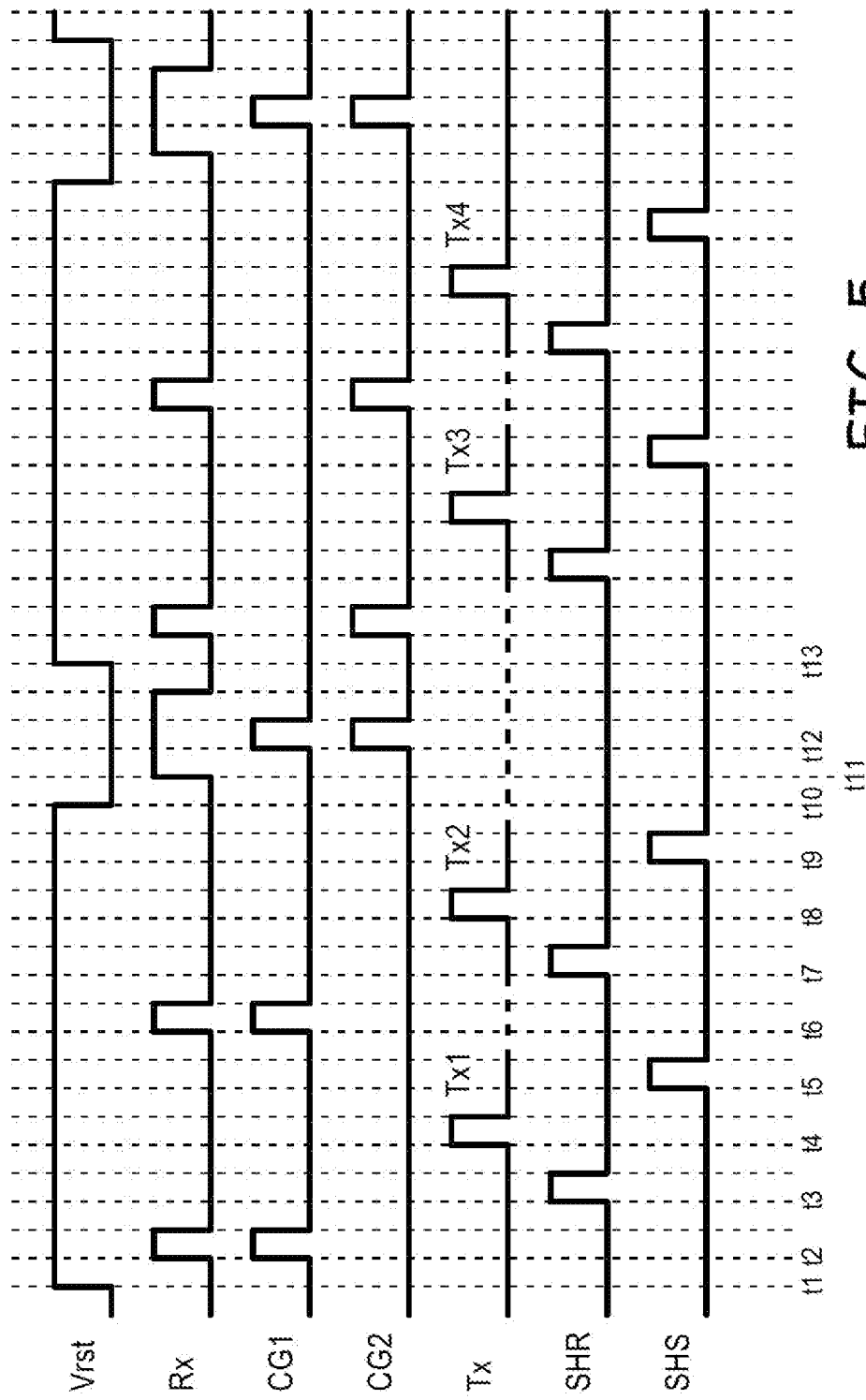
FIG. 5 is a timing diagram illustrating the image sensor pixel of FIG. 4 operating in high conversion gain mode in accordance with an embodiment of the present invention.

FIG. 5 is a timing diagram illustrating the operation of the pixel circuitry of FIG. 4 in high conversion gain mode. At time t1, reset voltage Vrst may be driven to a high voltage level. At time t2, reset control signal Rx and first conversion gain control signal CG1 may be pulsed high (e.g., Rx and CG1 may be temporarily asserted) to reset FD1. At time t3, a sample-and-hold reset signal SHR representing a reset signal value of FD1 may be read out and held at a first storage element.

At time t4, charge transfer signal Tx1 may be pulsed high to transfer any charge that has accumulated in photodiode 400-1. Doing so may change the potential level of FD1 from the reset level by an amount that is proportional to the amount of charge that is currently being transferred. At time t5, a sample-and-hold image signal SHS representing an image signal value of FD1 may be read out and held at a second storage element. At this point, a final output signal corresponding to photodiode 400-1 may be obtained by calculating the difference between the reset signal held in the first storage element and the image signal held in the second storage element. Computing output signals in this way is sometimes referred to as performing correlated double sampling (CDS).

At time t6, reset control signal Rx and first conversion gain control signal CG1 may again be pulsed high to reset FD1. At time t7, signal SHR representing the reset signal value of FD1 may be read out and held at the first storage element. At time t8, charge transfer signal Tx2 may be pulsed high to transfer any charge that has accumulated in photodiode 400-2. Doing so may change the potential level of FD1 from the reset level by an amount that is proportional to the amount of charge that is currently being transferred. At time t9, signal SHS representing an image signal value of FD1 may be read out and held at the second storage element. At this point, a final output signal corresponding to photodiode 400-2 may be obtained by calculating the difference between the reset signal held in the first storage element and the image signal held in the second storage element.

At time t10, reset voltage Vrst may be driven low. At time t1, signal Rx may be pulsed high to drive intermediate node 408 to a low voltage level. While signal Rx is asserted, both CG1 and CG2 may be asserted to drive both FD1 and FD2 to the low voltage level (at time t12), effectively turning off both source follower transistors 414-1 and 414-2. At time t13, signal Vrst may be driven back high. Operation of the type shown from time t10 to t13 may therefore be used to deactivate a recently selected row. After time t13, signals associated with photodiodes 400-3 and 400-4 may be similarly read out (e.g., by pulsing high Tx3, Tx4, and CG2 using the exemplary sequence shown in FIG. 5).

Figure 6:
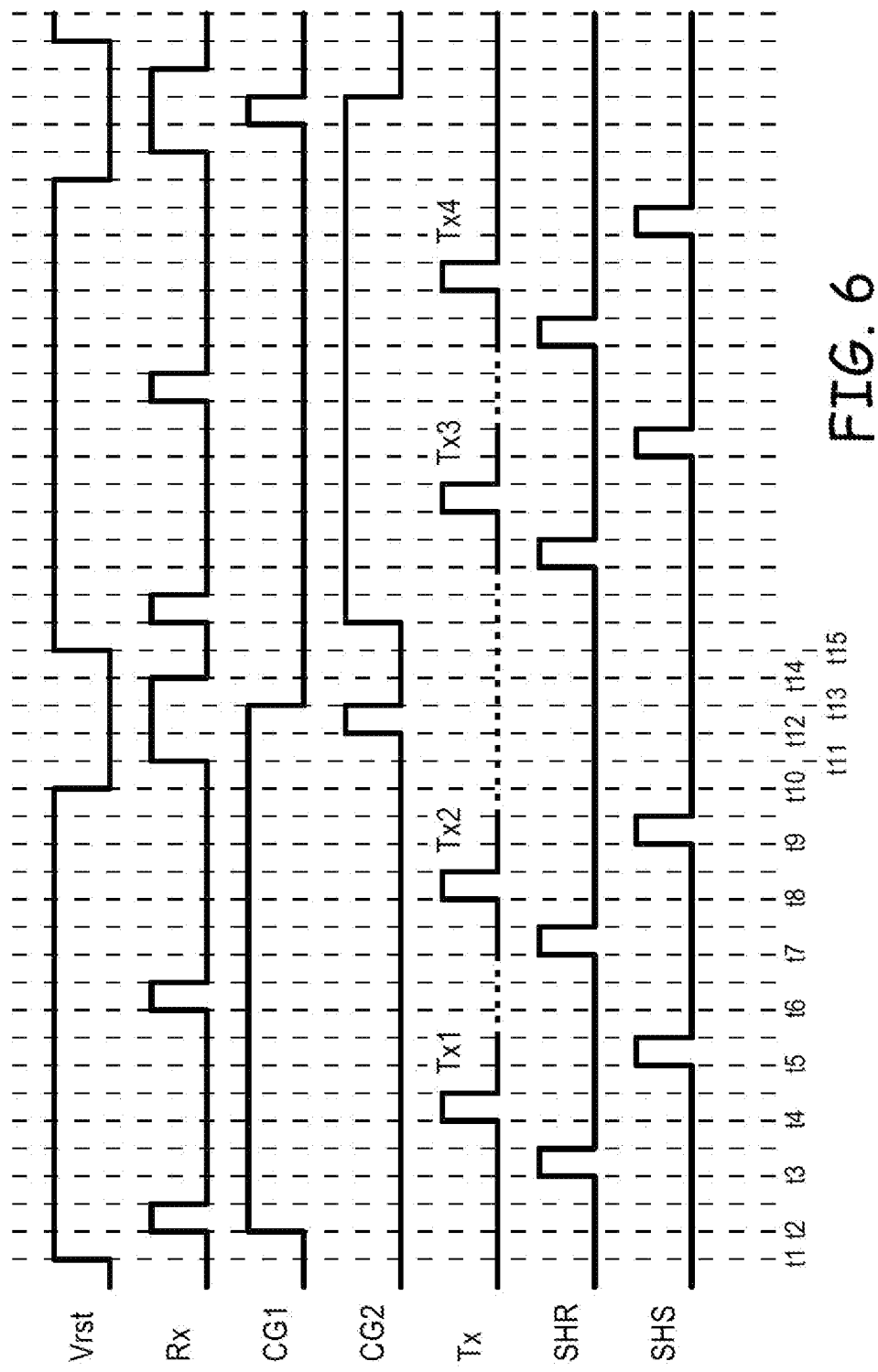
FIG. 6 is a timing diagram illustrating the image sensor pixel of FIG. 4 operating in medium conversion gain mode in accordance with an embodiment of the present invention.

FIG. 6 is a timing diagram illustrating the operation of the pixel circuitry of FIG. 4 in medium conversion gain mode. At time t1, reset voltage Vrst may be driven to a high voltage level. At time t2, first conversion gain control signal CG1 may be driven high, whereas reset control signal Rx may be pulsed high to reset FD1. At time t3, sample-and-hold reset signal SHR representing a reset signal value of FD1 may be read out and held at the first storage element.

At time t4, charge transfer signal Tx1 may be pulsed high to transfer any charge that has accumulated in photodiode 400-1. At time t5, sample-and-hold image signal SHS representing an image signal value of FD1 may be read out and held at the second storage element. At this point, a final output signal corresponding to photodiode 400-1 may be obtained by calculating the difference between the reset signal held in the first storage element and the image signal held in the second storage element.

At time t6, reset control signal Rx may again be pulsed high to reset FD1. At time t7, signal SHR representing the reset signal value of FD1 may be read out and held at the first storage element. At time t8, charge transfer signal Tx2 may be pulsed high to transfer any charge that has accumulated in photodiode 400-2. At time t9, signal SHS representing an image signal value of FD1 may be read out and held at the second storage element. At this point, a final output signal corresponding to photodiode 400-2 may be obtained by calculating the difference between the reset signal held in the first storage element and the image signal held in the second storage element. At time t10, reset voltage Vrst may be driven low. As shown in FIG. 6, all operations during time t2 to t10 are performed while signal CG1 is asserted. As described above, doing so will slightly increase the capacitance of the readout node by the gate capacitance of transistor 410-1 to provide an intermediate pixel gain.

At time L11, signal Rx may be pulsed high to drive intermediate node 408 to a low voltage level. At time t12 (while signal CG1 is still asserted), signal CG2 may be driven high to drive both FD1 and FD2 to the low voltage level, effectively turning off both source follower transistors 414-1 and 414-2. At time t13, both CG1 and CG2 may be deasserted. At time t14, signal Rx may be driven low. At time t15, signal Vrst may be driven back high. Operation of the type shown from time t10 to t15 may therefore be used to deactivate a recently selected row. After time t15, signals associated with photodiodes 400-3 and 400-4 may be similarly read out (e.g. by pulsing high Tx3 and Tx4 while CG2 is asserted using the exemplary sequence shown in FIG. 6).

Figure 7:
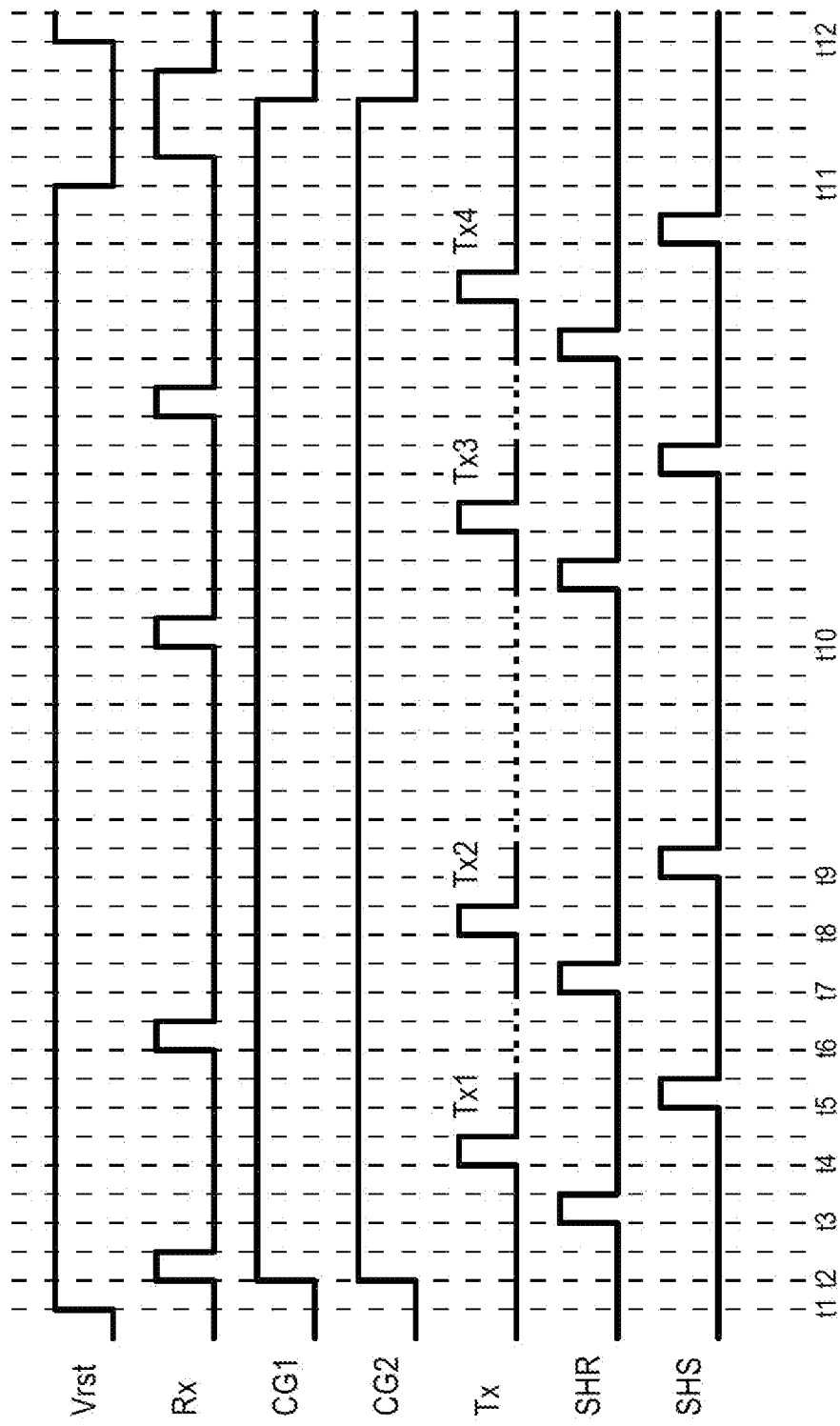
FIG. 7 is a timing diagram illustrating the image sensor pixel of FIG. 4 operating in low conversion gain mode in accordance with an embodiment of the present invention.

FIG. 7 is a timing diagram illustrating the operation of the pixel circuitry of FIG. 4 in low conversion gain mode. At time t1, reset voltage Vrst may be driven to a high voltage level. At time t2, conversion gain control signals CG1 and CG2 may be driven high, whereas reset control signal Rx may be pulsed high to reset FD1 and FD2 (referred to collectively as a combined FD node (cFD)). At time t3, sample-and-hold reset signal SHR representing a reset signal value of cFD may be read out and held at the first storage element.

At time t4, charge transfer signal Tx1 may be pulsed high to transfer any charge that has accumulated in photodiode 400-1 to cFD. At time t5, sample-and-hold image signal SHS representing an image signal value of cFD may be read out and held at the second storage element. At this point, a final output signal corresponding to photodiode 400-1 may be obtained by calculating the difference between the reset signal held in the first storage element and the image signal held in the second storage element.

At time t6, reset control signal Rx may again be pulsed high to reset cFD. At time t7, signal SHR representing the reset signal value of cFD may be read out and held at the first storage element. At time t8, charge transfer signal Tx2 may be pulsed high to transfer any charge that has accumulated in photodiode 400-2 to cFD. At time t9, signal SHS representing an image signal value of cFD may be read out and held at the second storage element. At this point, a final output signal corresponding to photodiode 400-2 may be obtained by calculating the difference between the reset signal held in the first storage element and the image signal held in the second storage element. As shown in FIG. 7, all operations during time t2 to t10 are performed while signals CG1 and CG2 are both asserted. As described above, doing so will increase the capacitance of the readout node by an additional FD capacitance and by the gate capacitances of transistors 410-1 and 410-2 to provide an low pixel gain.

Beginning at time t10, signals associated with photodiodes 400-3 and 400-4 may be similarly read out (e.g., by pulsing high Tx3 and Tx4 while CG1 and CG2 are asserted using the exemplary sequence shown in FIG. 7). From time t11 to t12, signal Rx may be pulsed high while Vrst is set to a low voltage level to deactivate the recently selected rows.

Figure 8:
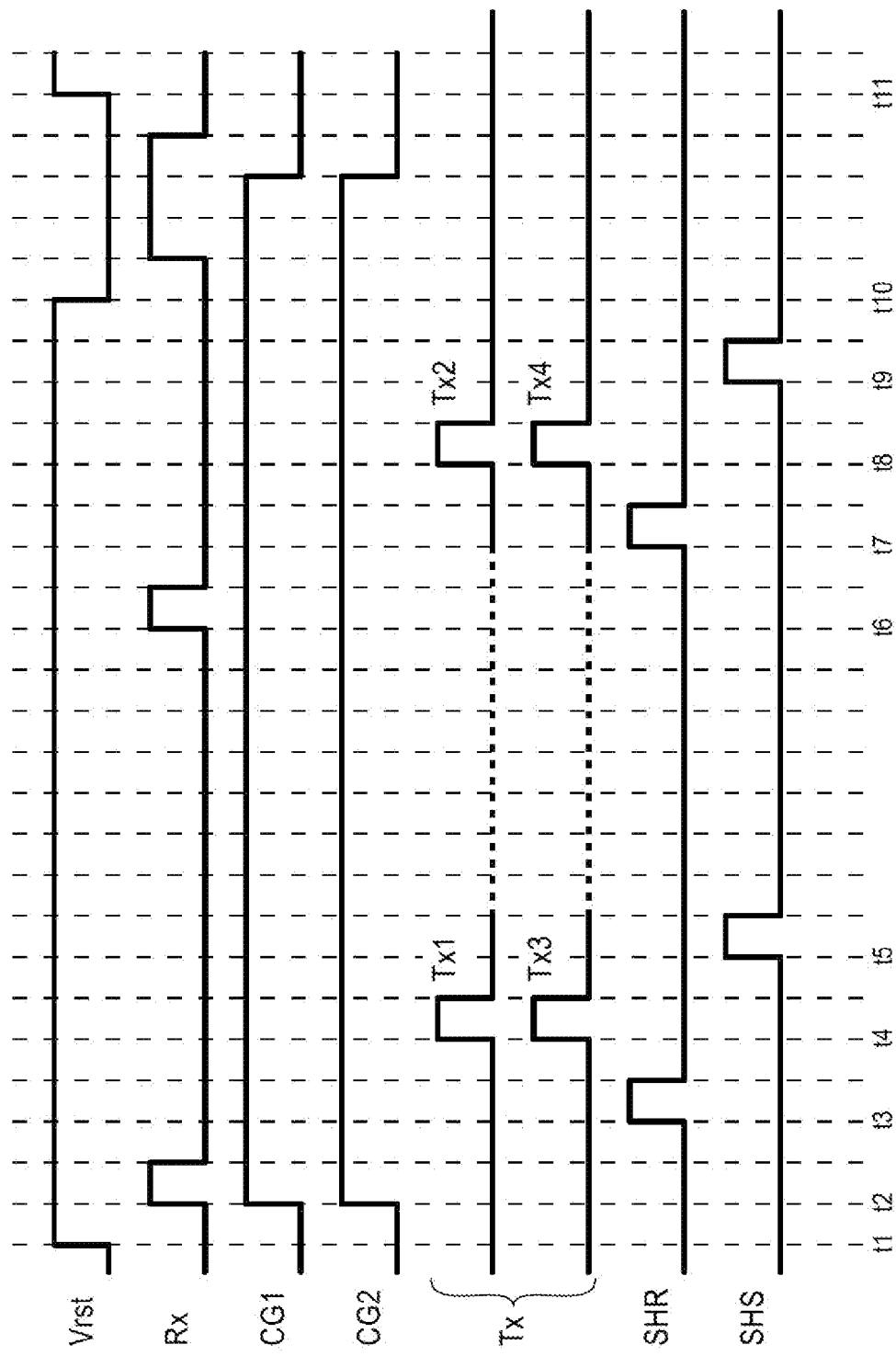
FIG. 8 is a timing diagram illustrating the image sensor pixel of FIG. 4 operating in low conversion gain mode with charge binning in accordance with an embodiment of the present invention.

In another suitable arrangement, the pixel circuitry may be operated in a low conversion gain "charge binning" mode (e.g., a mode in which the charge associated with more than one photodiode is merged/combined and read out). FIG. 8 is a timing diagram illustrating the operation of the pixel circuitry of FIG. 4 in low conversion gain mode with charge binning. At time t1, reset voltage Vrst may be driven to a high voltage level. At time t2, conversion gain control signals CG1 and CG2 may be driven high, whereas reset control signal Rx may be pulsed high to reset the combined FD (cFD). At time t3, sample-and-hold reset signal SHR representing a reset signal value of cFD may be read out and held at the first storage element.

At time t4, charge transfer signals Tx1 and Tx3 may be pulsed high to transfer any charge that has accumulated in photodiodes 400-1 and 400-3 which have a same color signal charge to cFD. At time t5, sample-and-hold image signal SHS representing an image signal value of cFD may be read out and held at the second storage element. At this point, a final output signal corresponding to the combined charge gathered using photodiodes 400-1 and 400-3 may be obtained by calculating the difference between the reset signal held in the first storage element and the image signal held in the second storage element.

At time t6, reset control signal Rx may again be pulsed high to reset cFD. At time t7, signal SHR representing the reset signal value of cFD may be read out and held at the first storage element. At time t8, charge transfer signals Tx2 and Tx4 may be simultaneously pulsed high to transfer any charge that has accumulated in photodiodes 400-2 and 400-4 which have a same color signal charge to cFD. At time t9, signal SHS representing an image signal value of cFD may be read out and held at the second storage element. At this point, a final output signal corresponding to the combined charge gathered using photodiodes 400-2 and 400-4 may be obtained by calculating the difference between the reset signal held in the first storage element and the image signal held in the second storage element. From time t10 to t11, signal Rx may be pulsed high while Vrst is set to a low voltage level to deactivate the recently selected rows.

Figure 9:
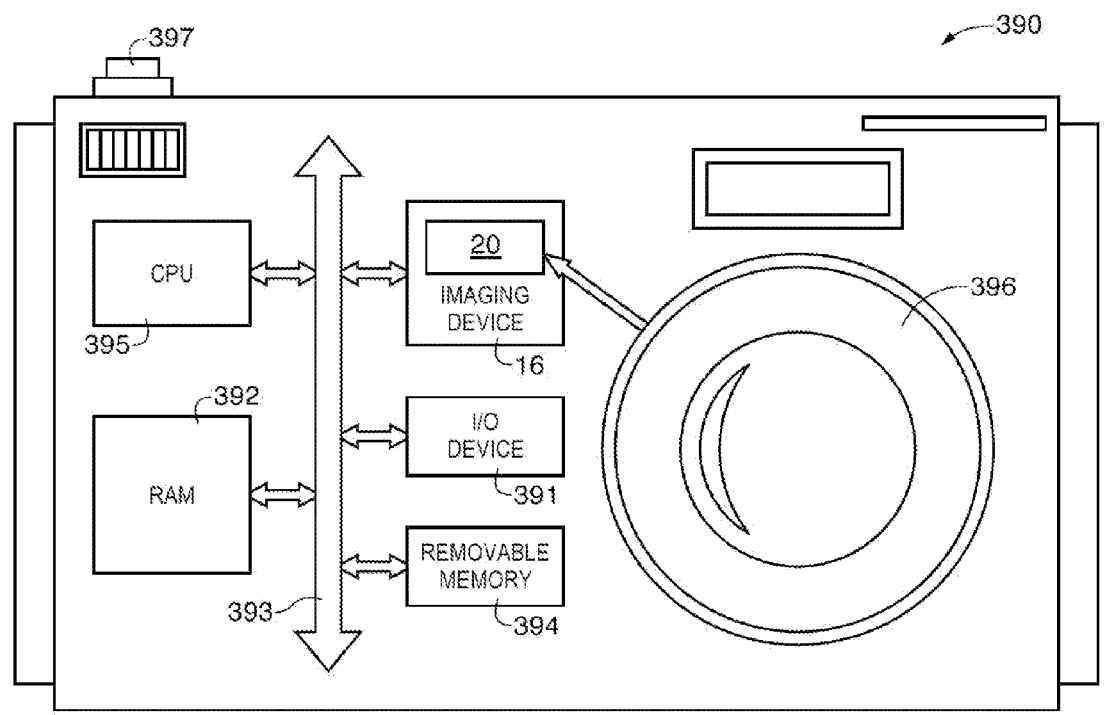
FIG. 9 is a block diagram of a processor system that may employ some of the embodiments of FIGS. 4-8 in accordance with an embodiment of the present invention.

FIG. 9 shows, in simplified form, a typical processor system 390. Processor system 390 is exemplary of a system having digital circuits that include imaging device 16 with the pixel circuitry operable in multiple gain modes of the type described in connection with FIGS. 4-8. Without being limiting, such a system could include a computer system, still or video camera system, scanner, machine vision, vehicle navigation, video phone, surveillance system, auto focus system, star tracker system, motion detection system, image stabilization system, video gaming system, video overlay system, and other systems employing an imaging device.

Processor system 390, which may be a digital still or video camera system, may include a lens such as lens 396 for focusing an image onto a pixel array such as pixel array 20 when shutter release button 397 is pressed. Processor system 390 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 16 may also communicate with CPU 395 over bus 393. System 390 may include random access memory (RAM) 392 and removable memory 394. Removable memory 394 may include flash memory that communicates with CPU 395 over bus 393. Imaging device 16 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating imaging systems with an image sensor having pixel circuitry operable in at least three gain modes. For example, the pixel circuitry may include first and second floating diffusion (FD) regions, first and second control transistors coupled in series between the first and second FD regions, a reset transistor that is coupled to an intermediate node at which the first and second control transistors are connected, a first group of photodiodes that is coupled to the first FD region via a first group of charge transfer gates, and a second group of photodiodes that is coupled to the second FD region via a second group of charge transfer gates. The pixel circuitry may also include a first source follower transistor for reading out signals at the first FD region and a second source follower transistor for reading out signals at the second FD region. Signal readout may be performed without use of any row select transistors. The reset transistor may be shared among the first and second groups of photodiodes and may be used to reset the first FD region and/or the second FD region.

Pixel circuitry configured in this way may be operable in a high gain mode, a medium gain mode, and a low gain mode. During the high gain mode, the first and second control transistors may be turned off. During the medium gain mode, only one of the first and second control transistors may be turned on. During the low gain mode, both the first and second control transistors may be turned on. During the low gain mode, charge from a first photodiode in the first group of photodiodes and charge from a second photodiode in the second group of photodiode may be simultaneously transferred to the first and second FD regions, respectively (to perform a low gain mode charge binning read operation).

The foregoing is merely illustrative of the principles of this invention and various modifications can be made by those skilled in the art without departing from the scope and spirit of the invention. The foregoing embodiments may be implemented individually or in any combination.

What is claimed is:

1. Image sensor pixel circuitry, comprising:
    a first floating diffusion region;
    a second floating diffusion region; and
    first and second control transistors coupled in series between the first and second floating diffusion regions, wherein the first control transistor has a first source-drain terminal that is coupled to the first floating diffusion region and a second source-drain terminal that is coupled to an intermediate node, and wherein the second control transistor has a first source-drain terminal that is coupled to the second floating diffusion region and a second source-drain terminal that is coupled to the intermediate node; and
    a reset transistor having a first source-drain terminal that is coupled to the intermediate node and a second source-drain terminal at which a reset voltage is applied.

2. The image sensor pixel circuitry defined in claim 1, further comprising:
    a first plurality of photosensitive elements coupled to the first floating diffusion region; and
    a second plurality of photosensitive elements coupled to the second floating diffusion region.

3. The image sensor pixel circuitry defined in claim 2, further comprising:
    a first plurality of charge transfer transistors coupled between the first plurality of photosensitive elements and the first floating diffusion region; and
    a second plurality of charge transfer transistors coupled between the second plurality of photosensitive elements and the second floating diffusion region.

4. The image sensor pixel circuitry defined in claim 1, further comprising:
    a first control line on which a first conversion gain mode control signal is provided, wherein the first control transistor has a gate terminal that is coupled to the first control line; and
    a second control line on which a second conversion gain mode control signal is provided, wherein the second control transistor has a gate terminal that is coupled to the second control line.

5. The image sensor pixel circuitry defined in claim 1, wherein the image sensor pixel circuitry is operable in a first gain mode during which both first and second control transistors are turned off, a second gain mode during which a selected one of the first and second control transistors is turned on, and a third gain mode during which the first and second control transistors are turned on.

6. The image sensor pixel circuitry defined in claim 1, further comprising:
    a power supply line;
    a shared column output line; and
    a source follower transistor having a drain terminal coupled to the power supply line, a gate terminal coupled to the first floating diffusion region, and a source terminal directly connected to the shared column output line.

7. A method for operating image sensor pixel circuitry that includes first and second floating diffusion nodes and first and second control transistors coupled in series between the first and second floating diffusion nodes, comprising:
    configuring the image sensor pixel circuitry in a first gain mode by turning off the first and second control transistors;
    configuring the image sensor pixel circuitry in a second gain mode by turning on a selected one of the first and second control transistors;
    configuring the image sensor pixel circuitry in a third gain mode by turning on the first and second control transistors; and
    with a reset transistor that is coupled between the first and second floating diffusion nodes, resetting the first floating diffusion node via the first control transistor and resetting the second floating diffusion node via the second control transistor.

8. The method defined in claim 7, further comprising:
    providing a first conversion gain during the first gain mode;
    providing a second conversion gain during the second gain mode; and
    providing a third conversion gain during the third gain mode, wherein the first conversion gain is greater than the second conversion gain, and wherein the second conversion gain is greater than the third conversion gain.

9. The method defined in claim 7, further comprising:
    transferring charge from a plurality of photosensitive elements to the first floating diffusion node.

10. The method defined in claim 7, wherein the image sensor pixel circuitry further includes a source follower transistor having a gate coupled to the first floating diffusion node, the method further comprising:
    turning off the source follower transistor by using the reset transistor to pass a low voltage signal to the first floating diffusion node via the first control transistor.

11. The method defined in claim 7, further comprising:
    simultaneously transferring charge from a first photosensitive element to the first floating diffusion node and transferring charge from a second photosensitive element to the second floating diffusion node.

12. The method defined in claim 7, wherein configuring the image sensor pixel circuitry in the third gain mode comprises shorting the first and second floating diffusion nodes.

13. The method defined in claim 7, wherein the image sensor pixel circuitry further includes a source follower transistor having a gate coupled to the first floating diffusion node, the method further comprising:
    outputting an image signal associated with the first floating diffusion node using the source follower transistor without a row select transistor.

14. A system, comprising:
    a central processing unit;
    memory;

a lens;
input-output circuitry; and
an imaging device having an image sensor pixel that includes:
- a first floating diffusion region;
- a first photodiode that is coupled to the first floating diffusion region via a first charge transfer transistor;
- a second floating diffusion region;
- a second photodiode that is coupled to the second floating diffusion region via a second charge transfer transistor;
- first and second control transistors coupled in series between the first and second floating diffusion regions, wherein the image sensor pixel is operable to perform low gain mode readout operations during which both the first and second control transistors are turned on, and wherein only one of the first and second charge transfer transistors is turned on during the low gain mode readout operations; and
- a reset transistor coupled between the first and second floating diffusion regions, wherein the reset transistor resets the first floating diffusion region via the first control transistor and resets the second floating diffusion region via the second control transistor.

15. The system defined in claim 14, wherein the image sensor pixel is operable to perform high gain mode readout operations during which both the first and second control transistors are turned off.

16. The system defined in claim 14, wherein the image sensor pixel is operable to perform medium gain mode readout operations during which only one of the first and second control transistors is turned on, wherein the image sensor pixel provides a first conversion gain when performing the high gain mode readout operations, a second conversion gain when performing the low gain mode readout operations, and a third conversion gain when performing the medium gain mode readout operations, and wherein the third conversion gain is less than the first conversion gain and greater than the second conversion gain.

* * * * *